United States Patent [19]

Funahashi et al.

[11] Patent Number: 5,556,587
[45] Date of Patent: Sep. 17, 1996

[54] METHOD OF MANUFACTURING CERAMICS USING A POROUS MOLD

[75] Inventors: Yoshio Funahashi, Komaki; Masao Kogai, Nagoya; Katsura Kasugai, Ichimiya; Hideki Kato, Nagoya, all of Japan

[73] Assignee: NGK Insulators, Ltd., Japan

[21] Appl. No.: 452,286

[22] Filed: May 26, 1995

Related U.S. Application Data

[60] Division of Ser. No. 167,028, Dec. 16, 1993, Pat. No. 5,451,152, which is a continuation-in-part of Ser. No. 155,136, Nov. 22, 1993, abandoned, which is a continuation-in-part of Ser. No. 855,478, Mar. 23, 1992, abandoned, which is a continuation of Ser. No. 539,334, Jun. 18, 1990, abandoned.

[30] Foreign Application Priority Data

Jun. 21, 1989 [JP] Japan .................................. 1-158554

[51] Int. Cl.$^6$ ............................... B28B 1/26; B28B 7/12
[52] U.S. Cl. ............................... 264/86; 264/87; 264/335; 264/571
[58] Field of Search ............................... 264/86, 87, 335, 264/517, 571, 301; 425/84, 85, DIG. 119, 437; 249/113, 134, 141, 135

[56] References Cited

U.S. PATENT DOCUMENTS

| 3,001,582 | 9/1991 | Kindseth et al. . |
|---|---|---|
| 3,286,974 | 11/1966 | Dean et al. . |
| 3,993,727 | 11/1976 | Skriletz et al. . |
| 4,027,723 | 6/1977 | Maurino et al. . |
| 4,454,081 | 6/1984 | Soulier . |
| 4,528,152 | 7/1985 | Aoyama et al. . |
| 4,818,457 | 4/1989 | Ito et al. . |
| 4,867,662 | 9/1989 | Shimahara et al. . |
| 4,874,304 | 10/1989 | Ito et al. . |
| 4,882,111 | 11/1989 | Murata . |
| 4,884,959 | 12/1989 | Ito et al. . |
| 4,913,868 | 4/1990 | Ito et al. . |
| 5,069,609 | 12/1991 | Ito et al. . |
| 5,451,152 | 9/1995 | Funahashi et al. . |

FOREIGN PATENT DOCUMENTS

| 61-121915 | 6/1989 | Japan . |
|---|---|---|
| 792351 | 3/1958 | United Kingdom . |

*Primary Examiner*—Karen Aftergut
*Attorney, Agent, or Firm*—Parkhurst, Wendel & Burr, L.L.P.

[57] ABSTRACT

A porous mold for manufacturing ceramics comprises a porous mold body including a mold central portion and a mold outer peripheral portion and having mold surface of a shape corresponding to an outer shape of a suspension insulator and other similar ceramics to be manufactured having a small diameter hollow cylindrical central core portion with a closed head portion and a large diameter shed portion extended from the core portion in a radial direction, wherein water absorption percentage of a mold surface side portion of the mold outer peripheral portion is larger than that of the mold central portion. The water absorption percentage of the mold surface side portion of the mold outer peripheral is 20–30%, and that of a mold head portion of the mold central portion is 10–20%. A difference of the water absorption percentage between the mold surface side portion of the mold outer peripheral portion and the mold head portion is 5–20%.

4 Claims, 4 Drawing Sheets

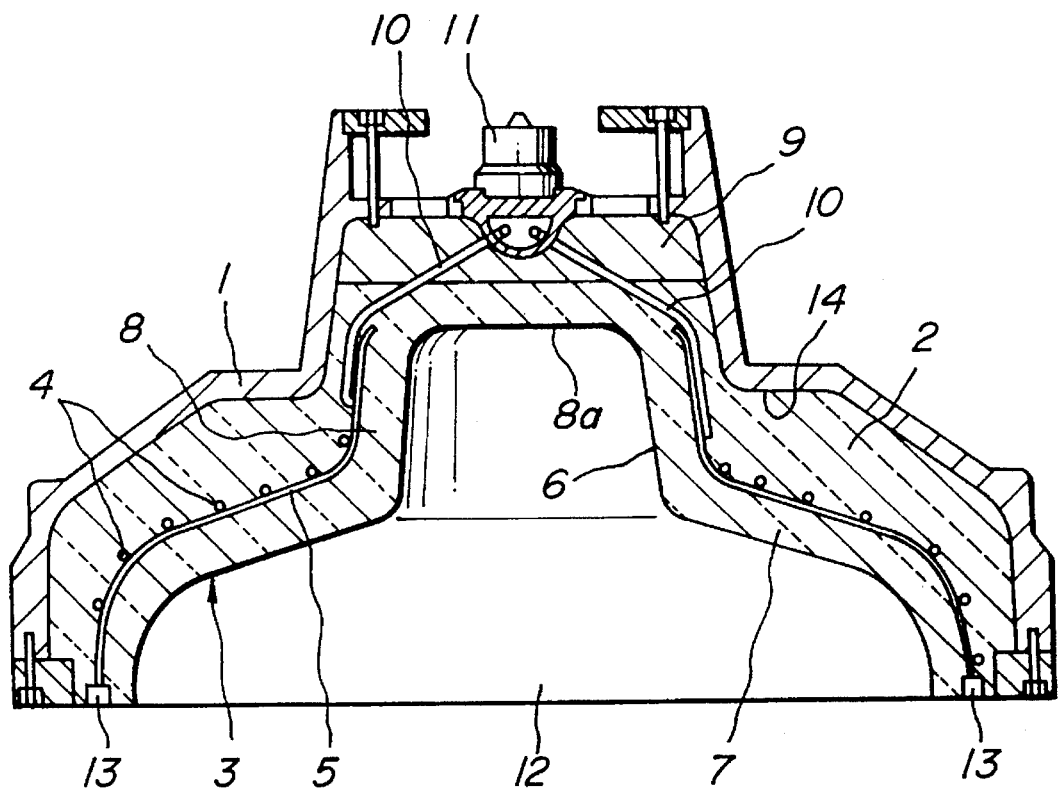
FIG_3

FIG_4
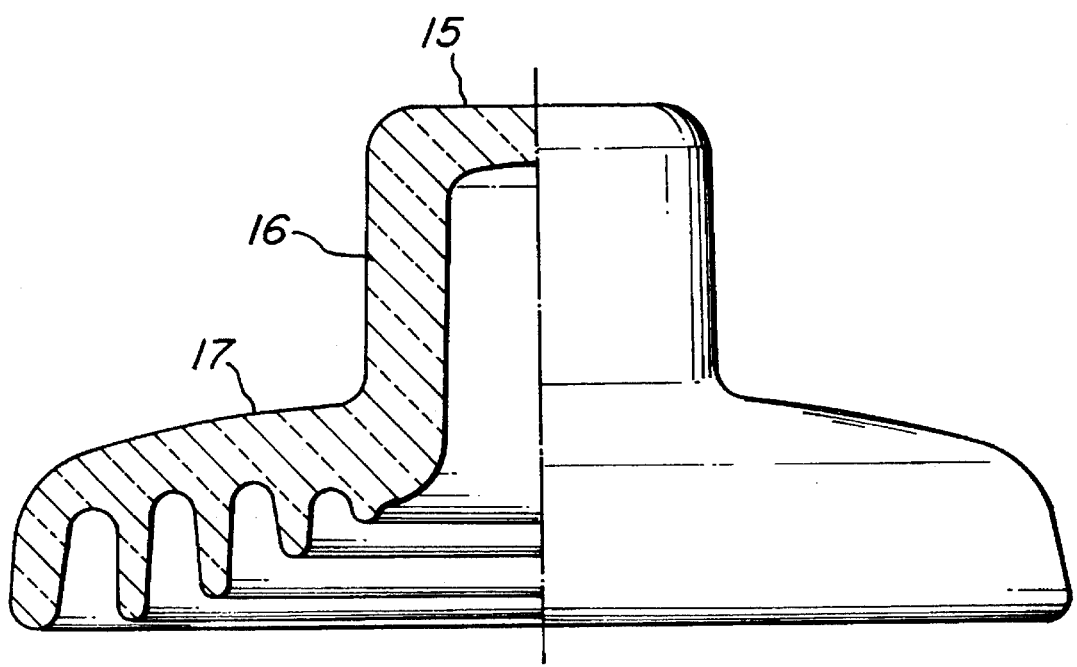

FIG_5
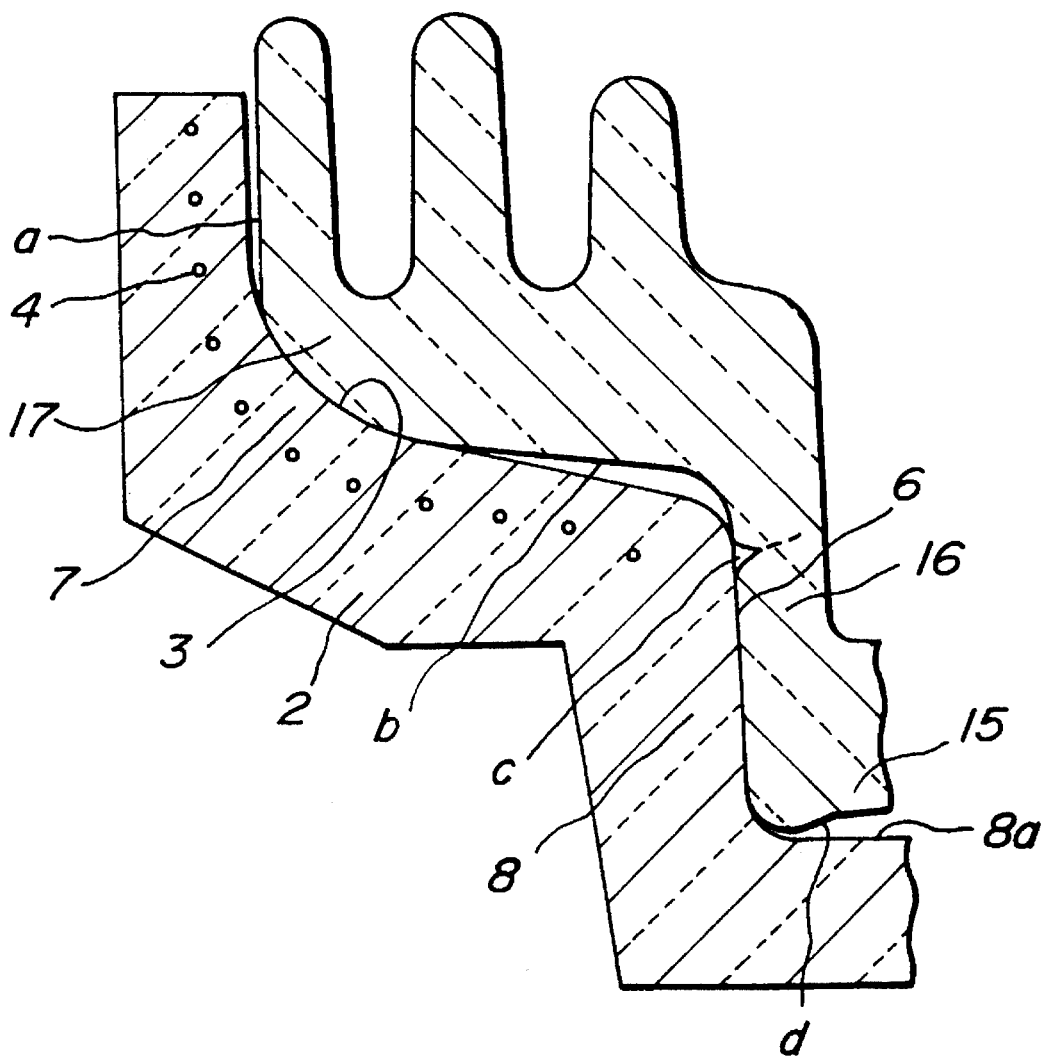

METHOD OF MANUFACTURING CERAMICS USING A POROUS MOLD

This application is a division of application Ser. No. 08/167,028, filed Dec. 16, 1993, now U.S. Pat. No. 5,451, 152, which in turn is a continuation-in-part of application Ser. No. 08/155,136, filed Nov. 22, 1993, now abandoned, which is a continuation-in-part of application Ser. No. 07/855,478, filed Mar. 23, 1992, abandoned, which is a continuation of application Ser. No. 07/539,334, filed Jun. 18, 1990, now abandoned.

BACKGROUND OF THE INVENTION

1. Field of the Invention

The invention relates to a method of manufacturing ceramics, particularly suspension insulators and other similar ceramics having a small diameter hollow cylindrical central core portion with a closed head portion and a large diameter shed portion extending from the central core portion in a radial direction.

2. Description of the Related Art

Hitherto, such a suspension insulator and the like having a small diameter hollow cylindrical central core portion and a large diameter shed portion has been manufactured by use of a porous mold. The porous mold comprises a porous mold body including a central portion and a peripheral portion and having a mold surface of a shape corresponding to an outer shape of ceramics to be molded, that is, outer shapes of the central core portion and the shed portion of the suspension insulator, and a porous tube embedded in the porous mold body along the mold surface.

In a conventional method of manufacturing the suspension insulator or the like, a batch is pressed on the mold surface, and closely adhered to the mold surface by applying a negative pressure to the whole mold surface through the porous tube to mold a molded product in a precise shape. After molding, pressurized air is blown out of the mold surface to release the molded product from the mold surface to thereby remove the molded product from the porous mold.

However, in the aforementioned conventional method, there are problems of mold cracks generated by a molding load owing to lowering of strength of the porous mold having a high porosity, deformation of the molded product caused by an excess air blow pressure acting on the molded product at the time of releasing the molded product from the porous mold, impossible releasability by a poor air blow pressure, breakage of the molded product at the boundary portion between a small diameter central core portion and a large diameter shed portion, deformation by rising of the head portion of the molded product and the like.

SUMMARY OF THE INVENTION

An object of the invention is to provide an improved method of manufacturing suspension insulators and other ceramics for solving the above problems.

Another object of the invention is to provide a porous mold used for carrying out the method according to the invention.

According to the first aspect of the invention, in a method of manufacturing suspension insulators and other similar ceramics having a head-closed small diameter hollow cylindrical central core portion and a large diameter shed portion extending from the core portion in a radial direction comprising steps of pressing a batch on the mold surface of a porous mold having a mold central portion and a mold outer peripheral portion having mold surfaces of a shape corresponding to outer shapes of said central core portion and large diameter shed portion to mold a molded product, thereafter blowing a gas out of the mold surface to release the molded product from the mold surface to thereby take the mold product out the mold, use is made of a porous mold having a water absorption percentage in the mold surface side portion in the mold outer peripheral portion being higher than that of the mold central portion.

According to the second aspect of the invention, a porous mold comprises a porous mold body including a mold central portion and a mold outer peripheral portion and having a mold surface of a shape corresponding to an outer shape of a suspension insulator and other similar ceramics having a head-closed small diameter hollow cylindrical central core portion and large diameter shed portion extending from the core portion in a radial direction, and water absorption percentage of a mold surface side portion in the mold outer peripheral portion is higher than that of the mold central portion.

According to the invention, the water absorption percentage of the mold surface side portion of said mold outer peripheral portion is preferably 20–30%, and that of a closed head portion of said mold central portion is preferably 10–20%.

Moreover, according to the invention, it is preferable to make a difference A–B between water absorption percentage A of the mold surface side portion of said mold outer peripheral portion and water absorption percentage B of the closed head portion of the mold central portion 5–20%.

Furthermore, according to the invention, the porous mold body including the mold central portion and the mold outer peripheral portion of a porous mold can be formed with a porous body such as gypsum, synthetic resin, porous ceramics, sintered metal and their mixture, and above all, gypsum is preferably used because it is cheap and easy to repair.

As a synthetic resin material, use is made of epoxy, urethane, phenol, acryal and silicon. As a ceramic material, use is made of mullits, cordierite, alumina, zircon and glass. As a sintered metal material, use is made of iron, copper, nickel, stainless steel, aluminum, brass and the like.

Moreover, according to the invention, means for controlling water absorption percentage between the head portion of the mold central portion and the mold surface side portion of the mold outer peripheral portion of the porous mold is preferably to locally change a porosity of the porous mold.

Moreover, according to the invention, means for controlling water absorption percentages between the head portion and the mold surface side portion of the porous mold is preferably arranging a porous tube along only the mold surface of the mold outer peripheral portion.

According to the invention, as described above, with the use of a porous mold wherein the water absorption percentage of the mold surface side portion of the mold outer peripheral portion is higher than that of the head portion of the mold central portion, a large amount of gas is supplied to the large diameter shed portion rather than to the center core portion at the time of releasing a mold body, thereby releasing the shed portion prior to the center core portion, and as a result, the molded product can easily be removed from the mold without any deformation or damage.

BRIEF DESCRIPTION OF THE DRAWING(S)

The above objects, characteristics and advantages of the invention will be clarified by the following explanation with FIG. 1 is a sectional view showing one embodiment of a porous gypsum mold of the present invention;

FIG. 3 is a sectional view illustrating a method of manufacturing the porous gypsum mold according to the invention;

FIG. 4 is a front view illustrating one embodiment of ceramics manufactured by the invention as a half in section; and FIG. 5 is an explanatory view of a problem such as deformation and the like caused in case of manufacturing the suspension insulator shown in FIG. 4 with the use of a conventional porous mold.

EXAMPLE

FIG. 4 illustrates one embodiment of ceramics manufactured by the present method, and the illustrated embodiment shows a typical suspension insulator having a small diameter hollow cylindrical central core portion 16 with a closed head portion 15 and a large diameter shed portion 17 extending from the central core portion 16 in a radial direction.

Figure 1:
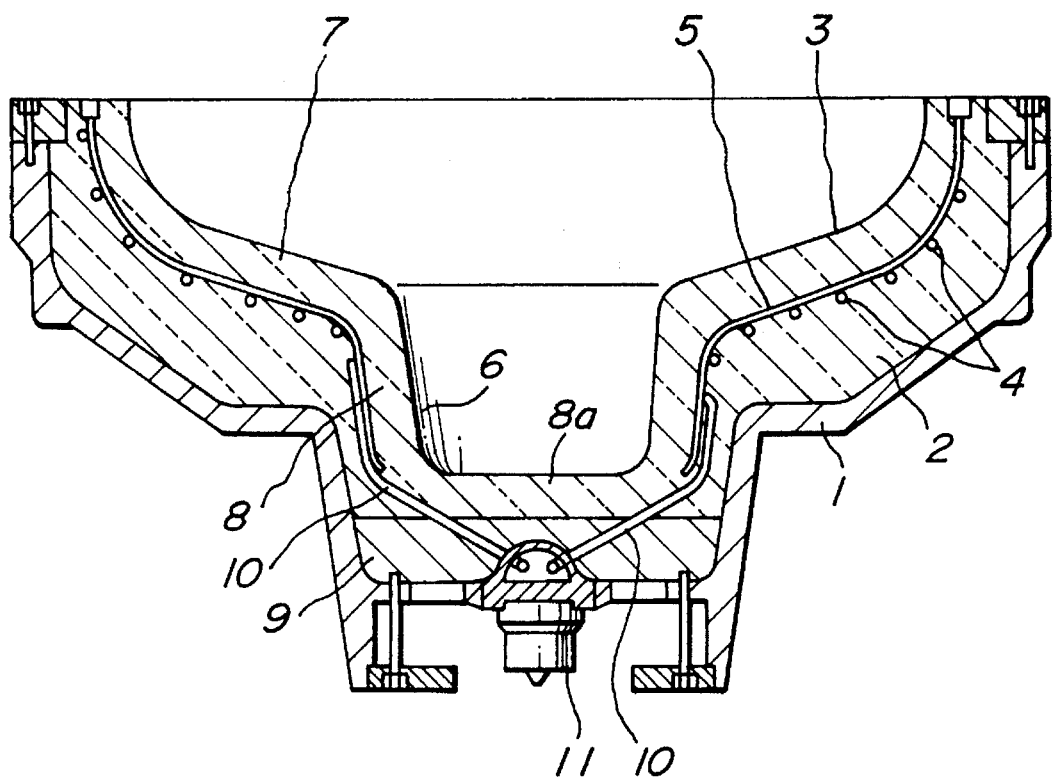

In case of manufacturing the above-described suspension insulator shown in FIG. 4, a batch is pressed on the mold surface of the porous mold shown in FIG. 1, a negative pressure is applied for the mold surface to closely adhere the batch to the mold surface, after molding, pressurized air is blown out of the mold surface to release a molded product from the mold surface and remove it from the mold.

DESCRIPTION OF THE PREFERRED EMBODIMENTS

FIG. 1 illustrates a porous gypsum mold used for molding a suspension insulator shown in FIG. 4, this porous gypsum mold includes a mold casing 1 made of metal such as aluminum, and a porous gypsum mold body 2 which is cast on the inner surface of the mold casing 1. The porous mold body 2 includes a mold surface side portion 7 in an outer peripheral portion and a mold center portion 8. The mold surface side portion 7 has a molding surface 3 of a shape corresponding to an outer shape of a large diameter shed portion 17 and the mold center portion 8 has a molding surface 6 of a shape corresponding to an outer shape of a small diameter center core portion 16 of a suspension insulator to be molded.

In the illustrated embodiment, a porous tube 4 is embedded in the porous gypsum mold body 2 only along the mold surface 3 of the mold surface side portion 7 of the mold outer peripheral portion, for example, at the position separated about 25 mm from the mold surface 3. The porous tube 4 is preferably, for example a glass fiber tube of the so-called "sizing tube" type.

Figure 2:
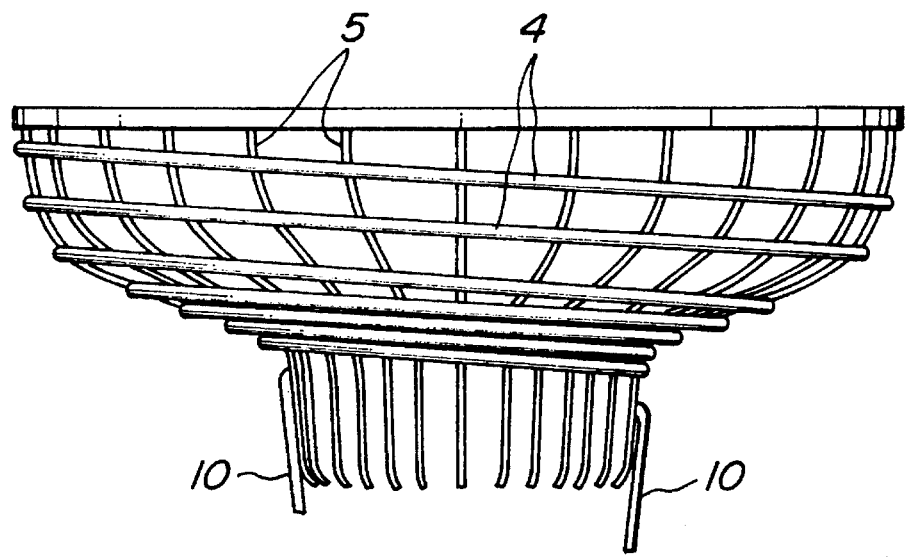
FIG. 2 is a front elevational view of a porous tube retained by a wirework core.

The porous tube 4 is spirally wound on the outside or inside of a wirework core 5 preferably made of steel wire in the form of a fan guard as shown in FIG. 2, and is connected at its inlet end to a vinyl tube 10 extending from a fitting 11 provided at a lower end portion of the casing 1. The fitting 11 is connected to a vacuum source (not shown) when the suspension insulator is molded, thereby applying a negative pressure to the mold surfaces 3 and 6 through the porous tube 4 to closely adhere batch to the mold surfaces 3 and 6 and mold the batch into a precise shape. After molding, the fitting 11 is connected to a compressed air source (not shown) to blow pressurized air from mold surfaces 3 and 6 through the porous tube 4 to thereby release a mold body from the mold. Moreover, reference numeral 9 is impermeable gypsum provided in the lower end portion of the casing 1 for preventing air from blowing from the mold center portion to the outside.

In the above illustrated gypsum mold, the porous tube 4 is embedded in gypsum of the porous mold body 2 along only the mold surface 3 of the mold outer peripheral portion 7 at the position separated by a distance of 25 mm from the mold surface 3. Thus, as a result of measuring water absorption percentage, the mold has a water absorption percentage of 20–30% at the mold outer peripheral portion 7 and 10–20% at the head portion 8a of the mold center portion 8. Moreover, the water absorption percentage can be increased at the mold surface side portion of the mold outer peripheral portion when compared to that of the mold center portion, and a difference A–B between the water absorption percentage A of the mold surface side portion 7 and the water absorption percentage B of the head portion 8a of the mold center portion 8 can be 5–20%.

When a porosity of the mold outer peripheral portion 7 is increased so that the water absorption percentage becomes larger than 30%, the resultant strength of the mold outer peripheral portion is lowered, a crack is formed in the mold by a molding load at the time of molding, and an amount of blowing-off air at the time of releasing becomes excessively large. Moreover, there is such a problem that the molded product is deformed by the blowing-off air as shown by "a" and "b" in FIG. 5. Contrary to the above, when the water absorption percentage of the mold outer peripheral portion is smaller than 20%, it becomes impossible to release the molded product, and if the molded product is forcibly released, there is a problem of breaking the nook portion of the molded product as shown by "c" in FIG. 5.

On the other hand, when the water absorption percentage of the head portion 8a of the mold central portion 8 becomes higher than 20%, an amount of blowing air becomes excessively large, and the head portion 15 of the molded product is raised and deformed by the blowing-off air at the time of releasing as shown by "d" in FIG. 5, and when the water absorption percentage of the head portion is lower than 10%, it becomes impossible to release the molded product.

Moreover, if a difference of the water absorption percentage between the mold outer peripheral portion and the mold central portion is not 5–20%, a pressure balance at the time of releasing becomes worse to invite deformation.

A method of manufacturing the above-described porous gypsum mold will be explained by referring to the drawings.

First, a porous tube 5 such as a sizing tube made of glass fiber is spirally wound on the outside or inside of a wirework core 5 made of a steel material to retain the porous tube in a predetermined shape as shown in FIG. 2. The thus shaped porous tube 4 is set around an inner mold 12 having an outer surface corresponding to the configuration of a suspension insulator to be manufactured by supporting the wirework core on a spacer 13 such that the porous tube 4 is spaced from the outer surface of the inner mold 12 with a predetermined distance for example 25 mm under the raised condition as shown in FIG. 3 after a parting agent such as a soap water is applied on the outer surface of the inner mold made of gypsum in order to improve the releasability of the inner mold under a semihardened condition. The inner mold 12 and the porous tube 4 are then covered by the mold casing 1 made of aluminum. Then, the vinyl tube 10 connected to one end of the porous tube 4 is connected to the fitting 11 in the mold casing 1 and permeable gypsum which has been degassed under a reduced pressure is injected into a gap 14 between the mold casing 1 and the inner mold 12 slowly so as not to introduce air bubble into the gypsum. The gypsum 2 fills upwardly and gradually fills the space which has been set with the porous tube 4. When the upper surface of the gypsum 2 reaches a predetermined level, injection of the porous gypsum 2 is stopped and the the unpermeable gypsum 9 is cast in a space above the porous gypsum 2.

Under the above condition, the gypsum is held at room temperature and initiates gradual hardening. When the cast gypsum reaches a semi-hardened condition, the inner mold 12 is removed and the mold casing 1 filled with the gypsum is then reversed to place the molding surface upwards. The mold casing is set on a compressed air supply device and the fitting 11 is connected to a compressed air supply (not shown) to supply compressed air to the porous tube 4. Compressed air is introduced to the porous tube with three stages of for example 0.5–1.0 kg/cm$^2$ for about 10 minutes, 1.5–2.0 kg/cm$^2$ for about 5–10 minutes and 2.5–3.0 kg/cm$^2$ by gradually increasing pressure for about 30–40 minutes in total. Moreover, at the latter stage of hydrating the gypsum mold, an air flow is regulated to 500 l/min, and in this stage, a dough of oil clay is placed on the mold surface 6 of the central portion 8 and pressed with a pressure of 3 kg/cm$^2$ by means of a piston to seal pores on the mold surface 6. The supplied compressed air in the fiber like porous tube 4 of sizing tube disperses within the semi-hardened gypsum through the fiber like wall of the porous tube to mainly flow towards a portion at the mold surface side of the porous tube 4 of the porous gypsum mold body to spout in the form of a bubble along with water from the mold surface 3. The mold surface is smoothly maintained since the mold central portion 8 including the head portion 8a and the mold casing side portion of the mold peripheral portion is closed by the mold casing 1, while the mold surface 3 of the mold surface side portion 7 of the mold peripheral portion is open.

The water spouted from the mold surface may be removed by means of a sponge or vacuum suction. Consequently, the mold surface side portion 7 of the porous gypsum mold body 2 is formed with more continuous pores so that the porous mold surface side portion 7 has a higher porosity than that of the head portion 8a of the mold central portion 8. Compressed air is continuously supplied until spouting of water from the porous gypsum 2 substantially stops for about 30 to 40 minutes while the cast gypsum is hardened. While compressed air is supplied, passages formed by the water bubbles spouted from the porous gypsum mold body remain in the form of fine continuous pores as gypsum is hardened to form the porous gypsum mold body 2 with continuous pores. The porous gypsum mold body 2 is then completely hardened with heat by means of infrared heating or in a heating oven to produce a porous gypsum mold.

The thus constructed porous mold of the invention can be used as a mold for molding ceramics such as suspension insulators and the like in the same manner as in the conventional mold. In case of molding, the whole of the mold surfaces 3, 6 of the porous mold is subjected to reduced pressure through the porous tube 4 by sucking air through the fitting 11 to closely adhere, the molded product to the mold surfaces 3, 6 so that the molded product is molded into a precise shape. Moreover, after molding the molded product, air is supplied into the porous mold from the porous tube 4 through the fitting 11 to blow air out of the mold surfaces 3, 6 of the porous mold, and thereby the mold body can be easily released from the mold surfaces 3, 6. Moreover, according to the invention, air is concentrically blown out of the mold surface side portion 7 having high porosity, so that, for example, a sufficient amount of air can be blown out to release a heavy insulator, and the insulator head portion can be prevented from deforming by controlling the air amount blown out of the insulator head portion as low as possible.

As explained above, the method of manufacturing ceramics and a porous mold used therefor according to the invention can maintain a desired porosity and a smooth surface suitable for manufacturing insulators by using extremely cheap gypsum, precise molding along the mold is possible by reduced pressure and deaeration, and easy releasing can be carried out by air blow by internal pressure at the time of releasing. Moreover, this porous mold can easily be repaired even when a part of the surface is broken, so that not only manufacturing cost but also maintenance cost is cheap.

Table 1 shows results of a comparison test showing the range of water absorption percentage of the porous gypsum mold according to the invention.

TABLE 1

| | | Water absorption percentage of mold surface side portion in mold outer peripheral portion | | | | | | |
|---|---|---|---|---|---|---|---|---|
| | | 10 | 15 | 20 | 25 | 30 | 35 | 40 |
| Water absorption percentage of head portion in mold central portion | 5 | 34~52% x | 0~5% Δ | 0~3% Δ | 0~2% Δ | 0~3% Δ | 3~32% x | 26~48% x |
| | 10 | 42~66% x | 0~2% Δ | 0% ○ | 0% ○ | 0% ○ | 0~3% Δ | 18~52% x |
| | 15 | 54~78% x | 28~49% x | 0% ○ | 0% ○ | 0% ○ | 0~2% Δ | 33~49% x |
| | 20 | 61~81% x | 44~78% x | 0~2% Δ | 0~2% Δ | 0% ○ | 0~3% Δ | 34~51% x |
| | 25 | 73~89% x | 57~82% x | 37~66% x | 24~35% x | 0~4% Δ | 4~28% x | 34~50% x |
| | 30 | 89~98% x | 64~75% x | 40~69% x | 36~47% x | 13~49% x | 29~67% x | 88~99% x |

In the comparison test of the porous gypsum mold according to the invention, use was made of various kinds of porous gypsum molds as shown in FIG. 1 having different combinations of water absorption percentage at the mold surface side portion and the head portion in the mold central portion by changing the position of the porous tube, pressure and time of compressed air introduced to the porous tube and pressure of oil clay to prepare many transmission suspension insulators having the central portion 16 of 60 mm in diameter, shed portion 17 of 254 mm in diameter and 100 mm in height with the use of a ceramics material having a composition of 10–35% of alumina, 20–35% of feldspar and 30–40% of clay, and their quality was finally estimated.

The water absorption percentage of the mold was obtained by steps of cutting a gypsum specimen from the mold surface side portion and the head portion of each mold into about 15×15×15 mm, finishing the surface with sand paper, drying the specimen for about 24 hours until it became constant weight by a hot drier of 40°–45° C., cooling the specimen to a room temperature, then weighing a dry weight of the specimen, thereafter charging the specimen in a normal temperature water, immediately reducing pressure as it is for 1 hour at above 700 mmHg, then taking the specimen out of water, quickly wiping the surface with a wet cloth to remove water drops, thereafter weighing a water absorbed weight of the specimen, thereafter determing the water absorption percentage by using the following equation.

$$\text{Water absorption percentage (\%)} = \frac{\text{specimen weight after water absorption} - \text{dry weight of specimen}}{\text{dry weight of specimen}} \times 100$$

In Table 1, a reject rate generated is shown by %, and its total estimation is shown by better ○, good △ and poor ×. As apparent from Table 1, the mold surface side portion 7 of the mold outer periphery portion has water absorption percentage of 20–30%, and the head portion of the mold center portion has that of 10–20%, so that it is possible to manufacture a suspension insulator of good quality at extremely high yield, and generation of poor goods can substantially be eliminated.

What is claimed is:

1. A method of manufacturing a ceramic product having small diameter hollow cylindrical central core portion with a closed head portion and a large diameter shed portion extending from the core portion in a radial direction, comprising the steps of pressing a batch of a ceramic material on a mold surface of a porous mold comprising a mold central portion and a mold outer peripheral portion contiguous with the central portion, wherein the mold surface is of a shape corresponding to outer shapes of the cylindrical central core portion and the large diameter shed portion of the ceramic product, to mold the ceramic product, thereafter blowing a gas out of the mold surface to release the ceramic molded product from the mold, wherein a water absorption percentage of a mold surface side portion of the mold outer peripheral portion is larger than a water absorption percentage of the mold central portion.

2. The method as claimed in claim 1, wherein the ceramic product is a suspension insulator.

3. The method as claimed in claim 1, wherein the water absorption percentage of the mold surface side portion of the mold outer peripheral portion is 20–30%, while the water absorption percentage of a head portion of the mold central portion is 10–20%.

4. The method as claimed in claim 2, wherein a difference of the water absorption percentage between the mold surface side portion of the mold outer peripheral portion and the head portion of the mold central portion is 5–20%.

* * * * *